United States Patent [19]

Lun

[11] Patent Number: 4,836,512
[45] Date of Patent: Jun. 6, 1989

[54] HYDRAULIC MOUNT WITH RECIPROCAL PARTITION AND ORIFICE

[75] Inventor: Saiman Lun, Englewood, Ohio
[73] Assignee: General Motors Corporation, Detroit, Mich.
[21] Appl. No.: 185,641
[22] Filed: Apr. 25, 1988
[51] Int. Cl.[4] .................. F16M 5/00; F16M 13/00
[52] U.S. Cl. .................. 267/140.1; 248/562; 248/559
[58] Field of Search ............. 267/113, 124, 140.1, 267/219, 35; 188/378; 180/300, 312; 248/559, 562, 636, 638; 123/192 R, 195 A

[56] References Cited

U.S. PATENT DOCUMENTS

| | | | |
|---|---|---|---|
| 4,570,911 | 2/1986 | Konismi | 267/140.1 |
| 4,588,173 | 5/1986 | Gold et al. | 267/140.1 |
| 4,611,795 | 9/1986 | Muzechuk | 267/140.1 |

FOREIGN PATENT DOCUMENTS 0084430 4/1986 Japan ................ 267/140.1

*Primary Examiner*—Robert J. Oberleitner
*Attorney, Agent, or Firm*—R. L. Phillips

[57] ABSTRACT

A hydraulic mount is constructed as a pair of mounting members, an elastomeric body that connects these members, an elastomeric diaphragm that is connected to one of the members and cooperates with the elastomeric body to define a closed cavity, and a partition that divides the cavity into a chamber enclosed by one side of the partition and the elastomeric body and another chamber enclosed by the other side of the partition and the diaphragm. A cylindrical sleeve interconnects the elastomeric body and one of the mounting members and sealingly peripherally clamps the diaphragm to the one mounting member independent of the partition which is mounted for unrestrained reciprocal movement and solely separates the chambers. A liquid fills the chambers and a damping orifice connects the chambers to provide damping. The damping orifice is provided by forming the partition with a spiral groove in an annular surface thereof that cooperates with an interior wall on the one mounting member to define the damping orifice.

1 Claim, 1 Drawing Sheet

HYDRAULIC MOUNT WITH RECIPROCAL PARTITION AND ORIFICE

TECHNICAL FIELD

This invention relates to hydraulic mounts and more particularly to the damping orifice connecting the chambers therein.

BACKGROUND OF THE INVENTION

In hydraulic mounts such as those used in motor vehicle engine mounting systems, the mount normally comprises a pair of mounting members, an elastomeric body, an elastomeric diaphragm and a damping orifice. The elastomeric body connects the mounting members and the diaphragm which is connected to only one of the mounting members cooperates with the elastomeric body to define a closed cavity. A partition then normally divides the cavity into a chamber that is enclosed by one side of the partition and the elastomeric body and another chamber that is enclosed by the other side of the partition and the diaphragm. A liquid fills the chambers and a damping orifice connects the chambers to provide a damping effect by throttling liquid flow therebetween. Normally, the damping orifice is through such a partition and because of the length required, the partition has been made in two parts and with a channel in one of their interfaces so as to define a spiral passage that forms the damping orifice. For example, see U.S. Pats. Nos. 4,588,173 and 4,611,795 assigned to the assignee of this invention which disclose the details of such prior hydraulic engine mount designs.

SUMMARY OF THE INVENTION

An object of the present invention is to both simplify the construction of the damping orifice and make it readily changeable to a wide range of damping characteristics. This is accomplished by forming the partition as a rigid singular imperforate body with an annular surface by which same is mounted in an interior annular wall on one of the two mounting members and wherein the body may be restrained against movement or may be free to move reciprocally to provide a decoupling effect as disclosed in applicant's copending application Serial No. 185,642 filed Apr. 25, 1988 concurrently herewith. The rigid partition body is formed with a spiral groove in its annular surface that cooperates with the interior wall on the one mounting member to define a damping orifice that is open at its opposite ends to the respective chambers. With such an arrangement, there may be one or more such spiral grooves and thus orifices and their cross section and length may be readily changed to produce the desired damping characteristics.

These and other objects, advantages and features of the present invention will become more apparent from the following description and drawing in which:

DETAILED DESCRIPTION OF PREFERRED EMBODIMENT

Figure 1:
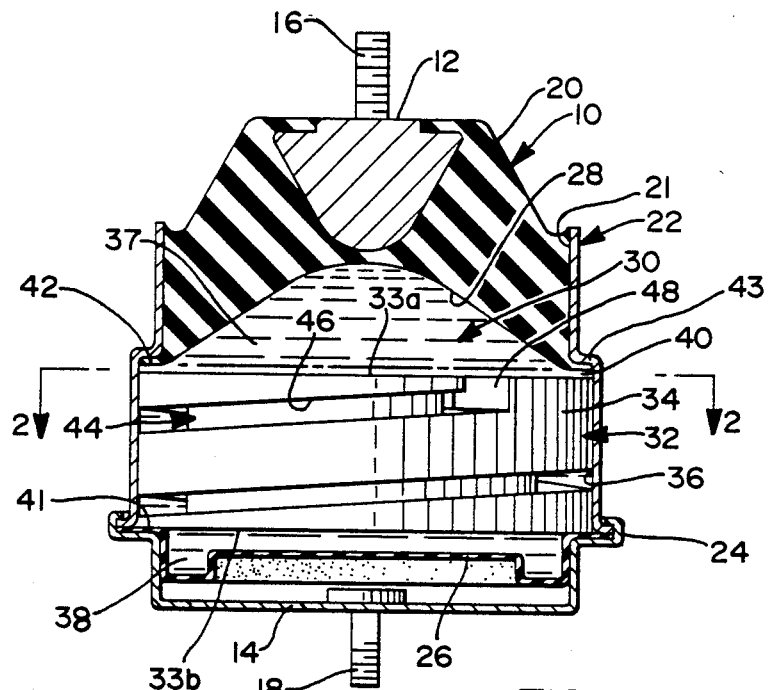
FIG. 1 is a view partly in section of a preferred embodiment of a hydraulic engine mount constructed according to the present invention.
Figure 2:
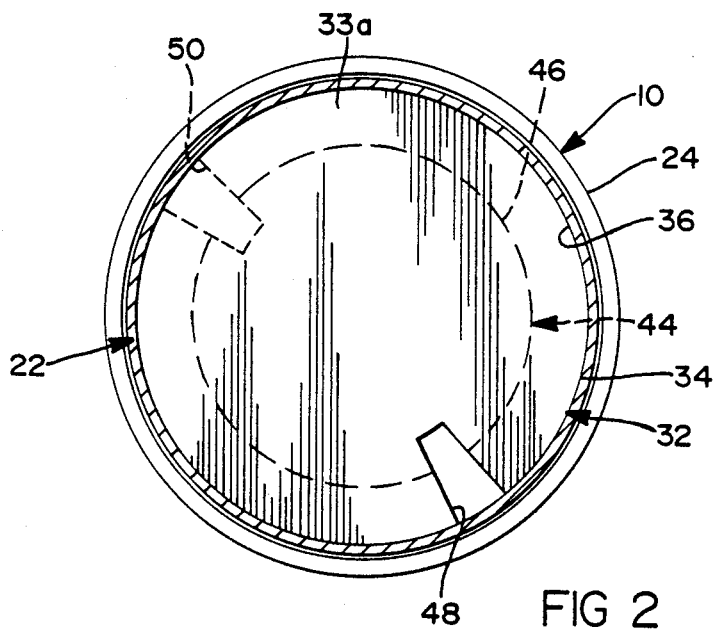
FIG. 2 is a view taken along the line 2—2 in FIG. 1.

Referring to FIG. 1, the hydraulic mount 10 thereshown is adapted to operate as one of several mounts in a motor vehicle engine mounting system and for that purpose has a pair of mounting members 12 and 14 each having a stud 16 and 18 by which the mount is connected to the vehicle's engine and frame or other supporting structure (not shown). In addition to the mounting members 12 and 14, the mount comprises an elastomeric body 20 that is bonded to the exterior of the upper mounting member 12 and to an interior wall 21 of a stepped cylinder or sleeve 22 that is mechanically joined to the lower mounting member 14 by an annular crimped connection 24. An elastomeric diaphragm 26 is sealingly connected about its perimeter to the lower mounting member 14 by being sandwiched in the crimped connection 24 and cooperates with a concave side 28 of the elastomeric body 20 to define a closed cavity generally designated as 30. These members are all generally right circular cylindrically shaped as seen in FIG. 2. The cylindrical sleeve 22 interconnects the elastomeric body and the mounting member 14 as well as sealingly peripherally clamping the diaphragm 26 to the mounting member 14 independent of a partition member 32.

A rigid right circular cylindrical, singular, imperforate, combination partition and orifice body 32 with parallel flat ends 33A and 33B at right angles to the axis of this body is mounted at and by a cylindrical surface 34 thereon for unrestrained reciprocal movement within prescribed limits in the larger diameter interior cylindrical wall 36 of the intermediate sleeve 22. The side clearance between the combined partition and orifice body 32 and the wall 36 is made small enough so that the former at its flat ends 33A and 33B effectively solely separates the cavity into an upper chamber 37 and a lower chamber 38 respectively which are filled with a liquid having a low freezing temperature (e.g. conventional engine coolant anti-freeze solution). The axial dimension of the combination partition and orifice body 32 is less than that of the cylindrical wall section 36 leaving the clearance 40 seen in FIG. 1 to permit this free reciprocal movement which is from the down position shown in FIG. 1 where its lower peripheral edge seats on an annular portion 41 of the diaphragm that is supported by the lower mounting member to an up position where its upper peripheral edge seats on a flange 42 that is formed integral with the elastomeric body 20 and is supported by the annular step 43 in the sleeve 22. Movement of the combination partition and orifice occurs for example when high speed road transmitted vibrations are such as to cause relative reciprocal movement between the mounting members 12 and 14 such that the upper chamber contracts and forces the body 32 downward and alternately the lower chamber contracts and forces this body upward within the prescribed limits of travel as determined by the axial end clearance 40 which may for example be ±0.1 mm.

Damping beyond such prescribed small displacements is provided by a damping orifice 44 that connects the two chambers 37 and 38 and provides damping by throttling the liquid flow therethrough between the chambers upon amplitudes above the free decoupler displacement amplitudes previously described. The damping orifice 44 is very simply formed by a spiral groove or channel 46 in the exterior 34 of the member. The groove 46 spirals about the member 32 from the upper end 33A thereof to the lower end 33B and cooperates with the interior wall 36 to wholly define the damping orifice which opens at one end 48 to the upper chamber 37 and at its other end 50 to the lower chamber 38.

While only a single groove (orifice has been shown, it will be understood that there may be more grooves and thus orifices with such orifices arranged in parallel to produce the desired damping characteristics. Furthermore, their cross section and length may be readily changed to produce the desired damping characteristic.

Preferably, the partition 32 is made of molded plastic and because there is less total parts, there is a correspondent reduction in the assembly operation as well as cost. Moreover, any errors are more readily detected in the mounting of this single part as compared with a two part partition that also forms a damping orifice internal thereof.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. A hydraulic mount comprising a pair of mounting members, an elastomeric body connecting said members, an elastomeric diaphragm connected to one of said members and cooperating with said elastomeric body to define a closed cavity, a partition dividing said cavity into a chamber that is enclosed by one side of said partition and said elastomeric body and another chamber that is enclosed by the other side of said partition and said diaphragm, a liquid filling said chambers, and a damping orifice connecting said chambers characterized by a cylindrical sleeve interconnecting said elastomeric body and said one mounting member and also sealingly peripherally clamping said diaphragm to said one mounting member independent of said partition, said partition comprising a rigid singular imperforate cylindrical body coextensive with said chambers mounted at a cylindrical surface thereof for unrestrained reciprocal movement between spaced stops in an interior cylindrical wall on said sleeve thereby to solely separate said chambers and effect limited cyclic volumetric change in said chambers so that the liquid is then not forced to flow through said damping orifice, and said cylindrical body further having a spiral groove in said cylindrical surface cooperating with said interior cylindrical wall on said sleeve to define said damping orifice.

* * * * *